(12) United States Patent
Deng et al.

(10) Patent No.: US 11,716,011 B2
(45) Date of Patent: Aug. 1, 2023

(54) COMMUNICATION CONTROL CIRCUIT FOR POWER SUPPLY CHIP

(71) Applicant: Silergy Semiconductor Technology (Hangzhou) LTD, Hangzhou (CN)

(72) Inventors: Jian Deng, Hangzhou (CN); Jin Jin, Hangzhou (CN); Qiukai Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 77 days.

(21) Appl. No.: 17/524,087

(22) Filed: Nov. 11, 2021

(65) Prior Publication Data

US 2022/0181960 A1 Jun. 9, 2022

(30) Foreign Application Priority Data

Dec. 7, 2020 (CN) .......................... 202011417596.7

(51) Int. Cl.
*H02M 1/00* (2006.01)
*H02M 7/219* (2006.01)
*H02M 7/00* (2006.01)
*H02M 1/088* (2006.01)

(52) U.S. Cl.
CPC ......... *H02M 1/088* (2013.01); *H02M 1/0012* (2021.05); *H02M 7/219* (2013.01); *H02M 7/003* (2013.01)

(58) Field of Classification Search
CPC ..... H02M 1/0012; H02M 7/003; H02M 7/219
See application file for complete search history.

(56) References Cited

U.S. PATENT DOCUMENTS

| 6,005,780 | A | 12/1999 | Hua |
| 6,580,258 | B2 | 6/2003 | Wilcox et al. |
| 9,000,702 | B2 * | 4/2015 | Huynh ...................... H02P 6/14 |
| | | | 438/106 |
| 9,325,254 | B2 | 4/2016 | Deng et al. |
| 9,331,588 | B2 | 5/2016 | Chen |
| 9,488,680 | B2 | 11/2016 | Xu |
| 10,211,733 | B1 * | 2/2019 | Jiang ....................... H02M 1/15 |
| 10,224,804 | B1 * | 3/2019 | Hsing ..................... H02M 1/32 |
| 2005/0151248 | A1 * | 7/2005 | Shau ....................... H01L 22/32 |
| | | | 257/734 |
| 2012/0169313 | A1 | 7/2012 | Lee |

(Continued)

FOREIGN PATENT DOCUMENTS

| CN | 102231605 A | 11/2011 |
| CN | 103280965 A | 9/2013 |

(Continued)

*Primary Examiner* — Gary A Nash

(57) ABSTRACT

A communication control circuit for a power supply chip, can include: a main control die having a main control circuit; a plurality of sub-control dice configured to respectively receive a control signal sent by the main control die, where each sub-control die comprises a sub-control circuit; and where a reference ground of each sub-control die is different from a reference ground of the main control die, the reference grounds of the plurality of sub-control dice are different with each other, and communication between the main control die and each sub-control die is achieved by a corresponding level conversion circuit.

14 Claims, 4 Drawing Sheets

(56) References Cited

U.S. PATENT DOCUMENTS

| | | | |
|---|---|---|---|
| 2013/0151919 A1* | 6/2013 | Huynh | G06F 1/26 |
| | | | 714/E11.023 |
| 2014/0078789 A1 | 3/2014 | Li et al. | |
| 2014/0239934 A1 | 8/2014 | Zhang | |
| 2015/0160270 A1 | 6/2015 | Shi et al. | |
| 2015/0280578 A1 | 10/2015 | Huang et al. | |
| 2015/0372471 A1* | 12/2015 | Sato | H01L 25/18 |
| | | | 361/18 |
| 2018/0330774 A1* | 11/2018 | Sforzin | G11C 11/406 |
| 2019/0260375 A1* | 8/2019 | Yang | H03K 3/3565 |
| 2021/0091678 A1 | 3/2021 | Wang | |

FOREIGN PATENT DOCUMENTS

| | | |
|---|---|---|
| CN | 106130378 A | 11/2016 |
| CN | 107968569 A | 4/2018 |

\* cited by examiner

COMMUNICATION CONTROL CIRCUIT FOR POWER SUPPLY CHIP

This application claims the benefit of Chinese Patent Application No. 202011417596.7, filed on Dec. 7, 2020, which is incorporated herein by reference in its entirety.

FIELD OF THE INVENTION

The present invention generally relates to the field of power electronics, and more particularly to communication control circuits and associated poser supply circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In power supply chip applications, electrical isolation is typically realized on a same die, and a circle of isolation circuits can be included between two control circuits with different reference grounds, in order to realize isolation. In addition, if the voltage difference between the two control circuits is relatively large, a high-voltage isolation ring can be included in order to isolate a high-voltage device from a low-voltage device. However, a relatively large die area may be consumed, and an epitaxial layer manufacturing process may be needed, and as such the die manufacturing process is more complex with higher costs.

Figure 1:
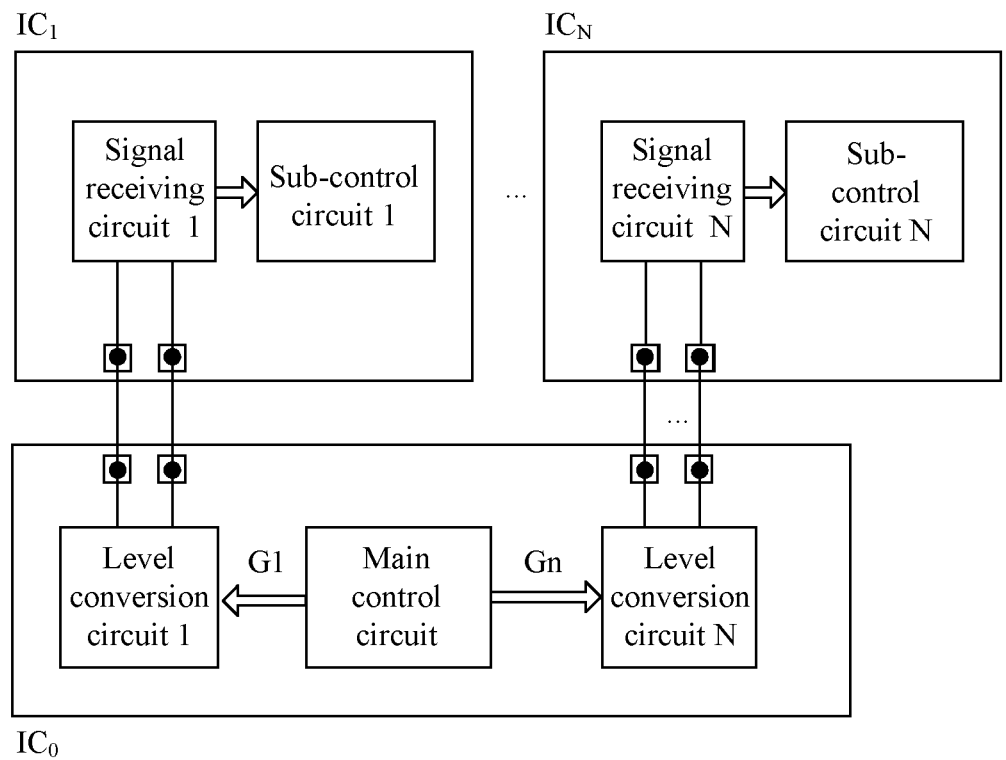
FIG. 1 is a schematic diagram of a first example communication control circuit, in accordance with embodiments of the present invention.

Referring now to FIG. 1, shown is a schematic diagram of a first example communication control circuit, in accordance with embodiments of the present invention. In this particular example, the communication control circuit can include main control die $IC_0$ and a plurality of sub-control dice. Main control die $IC_0$ can include a main control circuit and multiple level conversion circuits. For example, main control die $IC_0$ can include N level conversion circuits, where N is a positive integer. For example, the number of level conversion circuits may correspond to the number of the sub-control dice. For example, the communication control circuit can include N sub-control dice $IC_1$-$IC_N$. Each sub-control die may receive a control signal transmitted by main control die $IC_0$ for corresponding control, and the reference grounds of the N sub-control dice can be different. Further, each of the sub-control dice can include a sub-control circuit. It should be noted that the reference ground of the sub-control die may also be different from the main control circuit.

It should be understood that the main control circuit and the sub-control circuit herein can be any suitable circuitry for realizing a control function, which can generate different control signals to control other circuits (e.g., a drive control circuit, a feedback control circuit, a protection circuit, etc.). Further, each of the sub-control dice can also include a signal receiving circuit for receiving signals transmitted by corresponding level conversion circuit in main control die $IC_0$, and converting the signal into a signal required by the control circuit. In this embodiment, sub-control die $IC_1$ can include signal receiving circuit 1 and sub-control circuit 1, ..., and sub-control die $IC_N$ can include signal receiving circuit N and sub-control circuit N.

Taking the communication between main control die $IC_0$ and sub-control die $IC_1$ as an example to illustrate, the communication principle between the main control die and other sub-control dice can be the same. Level conversion circuit 1 can transform the level of control signal G1 transmitted by the main control circuit to a level suitable for sub-control die $IC_1$ to receive, in order to realize communication between main control die $IC_0$ and sub-control die $IC_1$. It should be understood that the level of control signal G1 generated by the main control circuit can be relative to the reference ground of main control die $IC_0$. When it is transmitted to sub-control die $IC_1$ with a different reference ground, the level of the signal can be converted before it can be used to control the circuit in sub-control circuit die $IC_1$.

In addition, the maximum withstand voltage that the devices in level conversion circuit 1 bear can be the maximum voltage difference between the levels of main control die $IC_0$ and sub-control die $IC_1$. Therefore, the high voltage may only be borne by level conversion circuit 1. Since sub-control die $IC_1$ is separated from main control die $IC_0$, the level conversion circuit enduring high voltage can be integrated in main control die $IC_0$ without the use of a high voltage isolation ring. That is, although main control die $IC_0$ can include the level conversion circuit with high voltage, it may not require the high voltage isolation ring. Therefore, the epitaxial layer process can become unnecessary, thus reducing the costs of the fabrication and the manufacturing difficulty of the die, and also greatly reducing the area of the die. Of course, any suitable level conversion circuit that can realize the above functionality can be applied in certain embodiments.

As shown in FIG. 1, the multiple lever conversion circuits 1-N in main control die $IC_0$ can be respectively connected to the signal receiving circuit in sub-control dice $IC_1$-$IC_N$ through wire bonding or redistribution layers. It should be understood that any suitable connection among dice can be utilized in certain embodiments. For example, main control die $IC_0$ and sub-control dice $IC_1$-$IC_N$ can ultimately be packaged in the same chip. Here, there may be no need for a high voltage isolation ring between control circuits with different reference grounds, and thus the volume of the packaged chip can be greatly reduced.

Figure 2:
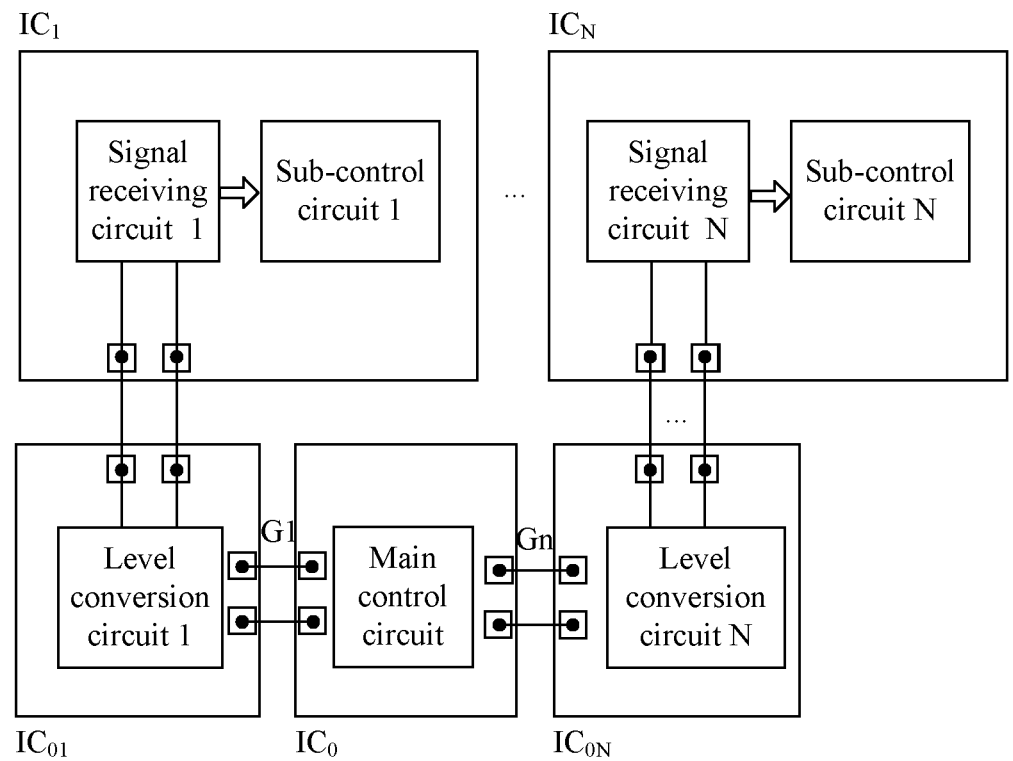
FIG. 2 is a schematic diagram of a second example communication control circuit, in accordance with embodiments of the present invention.

Referring now to FIG. 2, shown is a schematic diagram of a second example communication control circuit, in accordance with embodiments of the present invention. In this particular example, the communication control circuit can include main control die $IC_0$, multiple sub-control dice, and multiple conversion dice, where the number of conversion dice can correspond to the number of sub-control dice. The number of the sub-control dice and the conversion dice can be taken as N as an example, where N is a positive integer. Main control die $IC_0$ can include a main control circuit for generating various control signals. The structure of sub-control dice $IC_1$-$IC_N$ can be substantially the same as that of the embodiment illustrated above. The difference is that each level conversion circuit in main control die $IC_0$ in FIG. 1 can be used as a single die; that is, conversion dice $IC_{01}$-$IC_{0N}$. As the level conversion circuit is separated from main control chip $IC_0$, level conversion circuits 1-N can connect to the main control circuit in main control die $IC_0$ through wire bonding or redistribution layers to correspondingly receive control signals G1-Gn transmitted by the main control circuit.

Similarly, level conversion circuits 1-N in conversion dice $IC_{01}$-$IC_{0N}$ can respectively be connected to signal receiving circuits 1-N in sub-control dice $IC_1$-$IC_N$ through wire bonding or redistribution layers, in order to convert the levels of control signals G1-Gn transmitted by main control die $IC_0$ into levels suitable for sub-control dice $IC_1$-$IC_N$ to receive, thereby realizing communication between main control die $IC_0$ and each sub-control die $IC_1$-$IC_N$. For example, the level conversion circuit can be taken as a conversion die, such that only one conversion die may need to be designed to realize the level conversion circuit with similar functions, and complex functions can be realized by placing a plurality of identical conversion dice, with associated modular design benefits.

Figure 3:
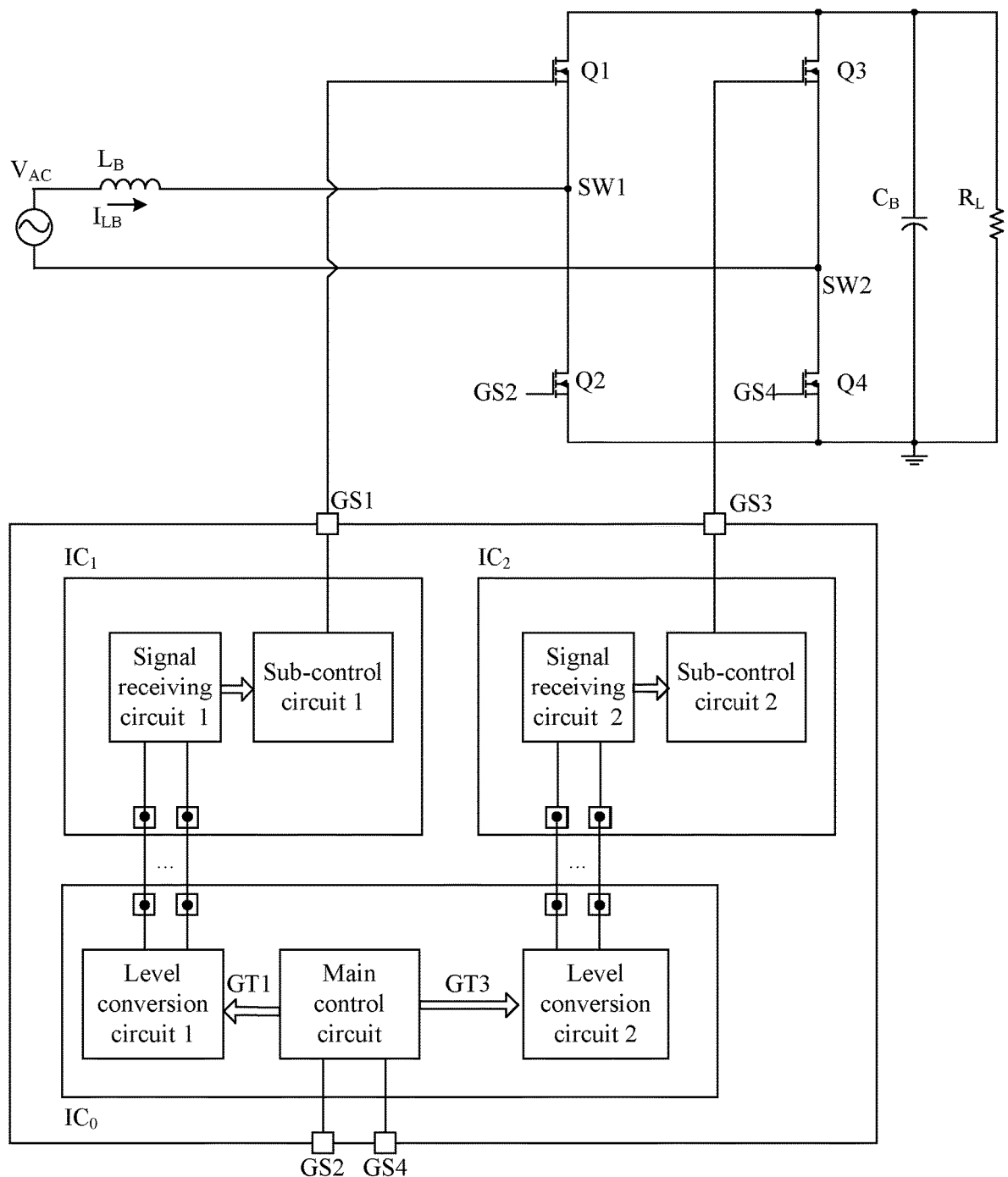
FIG. 3 is a schematic diagram of a first example communication control circuit applied to a first example power supply circuit, in accordance with embodiments of the present invention.

Referring now to FIG. 3, shown is a schematic diagram of a first example communication control circuit applied to a first power supply circuit, in accordance with embodiments of the present invention. In this particular example, the communication control circuit of FIG. 1 is taken as an example, and it should be understood that it can also be applied to the second communication control circuit. For example, a bridgeless PFC circuit can include two bridge arms connected in parallel at both terminals of load RL, where the first bridge arm can include power switches Q1 and Q2 connected in series, and the second bridge arm can include power switches Q3 and Q4 connected in series. In addition, a first terminal of AC input voltage $V_{AC}$ can connect to common node SW1 of power switches Q1 and Q2 via inductor $L_B$, and a second terminal of AC input voltage $V_{AC}$ can connect to common node SW2 of power switches Q3 and Q4. Power switches Q1 and Q2 may be controlled by a high-frequency PWM pulse signal to switch, and power switches Q3 and Q4 can be controlled by a power frequency square wave signal to switch. It should be understood that other suitable control methods in the prior art can also be utilized in certain embodiments.

Since the drive of power switches Q1 and Q3 is floating, if the traditional driving control circuit is adopted, the control die may need to be isolated by a high voltage isolation ring, which can occupy a large amount of die area. In certain embodiments, the main control circuit and those two level conversion circuits can be designed on one die (e.g., main control die $IC_0$), while sub-control circuit 1 (e.g., driving control circuit 1) and signal receiving circuit 1 corresponding to power switch Q1 can be designed on one die (e.g., sub-control die $IC_1$), and sub-control circuit 2 (e.g., driving control circuit 2) and signal receiving circuit 2 corresponding to power switch Q2 are designed on one die (e.g., sub-control die $IC_2$), such that isolation can be realized without a high-voltage isolation ring.

In the embodiment, the main control circuit can generate a logical drive signal of each power switch (Q1-Q4), and level conversion circuit 1 may receive logical drive signal GT1, and can convert it to a signal adapted to the level of sub-control die $IC_1$. Signal receiving circuit 1 may receive the signal and can convert it to a signal capable of controlling driving control circuit 1, such that driving control circuit 1 can generate drive signal GS1 for power switch Q1. Similarly, level conversion circuit 2 may receive logical drive signal GT3, and can convert it to a signal adapted to the level of sub-control die $IC_2$. Signal receiving circuit 2 may receive the signal and can convert it into a signal capable of controlling driving control circuit 2, such that drive signal GS3 for power switch Q3 may be generated. Since power switches Q2 and Q4 are grounded, the corresponding driving control circuits may be disposed in the main control circuit to directly generate drive signals GS2 and GS4 for power switches Q2 and Q4.

In some embodiments, each level conversion circuit can include two switches, where each switch can be controlled to be on or off according to the control signals generated by the main control circuit, and a first terminal of each switch can connect to a high voltage power supply of the sub-control die, and a second terminal can connect to a reference ground of the main control circuit, such that only the switches of the level conversion circuit may bear high voltage difference. Therefore, the sub-control die itself can be manufactured by a low-voltage process, and a high-voltage switch can be integrated in the main control die without a high-voltage isolation ring due to the separation of the sub-control die and the main control die. That is, although the main control die can include high-voltage switch bearing high voltage, it may not need a high-voltage isolation ring nor an epitaxial layer process, thereby reducing manufacturing cost and process complexity, while also reducing the die area. For example, the function and implementation of level conversion circuits 1 and 2 can be the same, such that only one die of the level conversion circuit may need to be designed, the second communication control circuit shown in FIG. 2 can be adopted to separate the level conversion circuit, and the circuit design can be simplified by placing a plurality of identical dice.

Figure 4:
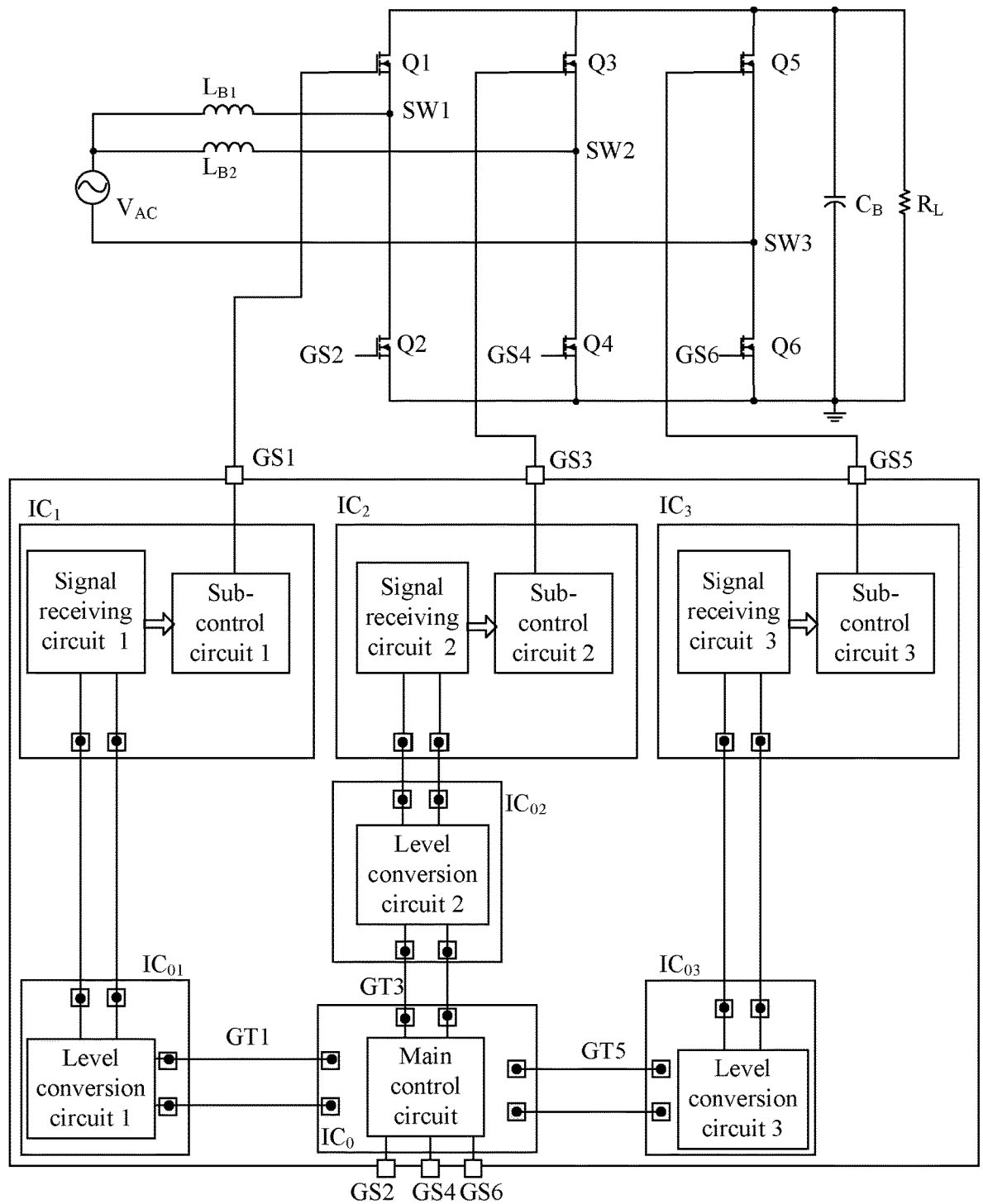
FIG. 4 is a schematic diagram of a second example communication control circuit applied to a second example power supply circuit, in accordance with embodiments of the present invention.

Referring now to FIG. 4, shown is a schematic diagram of a second communication control circuit applied to a second power supply circuit, in accordance with embodiments of the present invention. This arrangement can provide an interleaved parallel bridgeless power factor correction (PFC) to further reduce current ripple. In this particular example, the bridgeless PFC can include multiple bridge arms connected in parallel at both terminals of load $R_L$. Taking three bridge arms as an example, a first terminal of AC input voltage $V_{AC}$ can connect to common node SW1 of power switches Q1 and Q2 in a first bridge arm through inductor $L_{B1}$, and the first terminal can also connect to common node SW2 of power switches Q3 and Q4 in a second bridge arm through inductor $L_{B2}$. A second terminal of AC input voltage $V_{AC}$ can connect to common node SW3 of power switch Q5 and Q6 in a third bridge arm. For example, the reference grounds of sub-control dice corresponding to each upper power switch may be different, since upper power switches (Q1, Q3, and Q5) of the plurality of bridge arms can all be floating (i.e., not connected to the ground).

In particular embodiments, the main control circuit in main control die $IC_0$ may generate logical drive signals for each power switch. A sub-control circuit and a signal receiving circuit corresponding to an upper power switch of each bridge arm can be designed on one die to form a plurality of sub-control dice $IC_1$-$IC_3$. Each of the sub-control dice may be separated from the main control die, thereby avoiding the use of a high-voltage isolation ring, which can greatly save the die area and reduce the cost. In addition, since each of the sub-control dice can drive the upper power switch of each bridge, the structures and the implementation may be the same. Therefore, the level conversion circuit may realize communication between the control circuits with different reference grounds and be designed on one die. In other words, only one conversion die including a level conversion circuit may need to be designed, such that control of multiple upper switches can be realized by placing multiple conversion dice.

As shown in FIG. 4, level conversion circuit 1-3 may be located in conversion die $IC_{01}$-$IC_{03}$, respectively, to receive logical drive signals GT1, GT3, and GT5 from the main control circuit, and convert them to signals adapted to the level of control die $IC_1$-$IC_3$. For example, level conversion circuit 1 may receive logical drive signal GT1 and can convert it to a signal adapted to the level of sub-control die IC1. Signal receiving circuit 1 may receive the adapted signal and can convert it into a signal which can control driving control circuit 1, such that driving control circuit 1 may generate driving signal GS1 for power switch Q1. For example, the methods of generating drive signals GS3 and GS5 may be substantially the same. Since lower power switches (Q2, Q4, and Q6) of each bridge arm can connect to the ground level, the corresponding driving control circuits can be configured in the main control circuit to directly generate drive signals GS2, GS4, and GS6 for power switches Q2, Q4, and Q6.

The power supply circuit is described herein with respect to a bridgeless PFC circuit as an example, and one skilled in the art will recognize that power supply circuits including power switches with different reference grounds can also be applied. Further, the structure of the communication control circuit of certain embodiments can be applied to the circuits that need to transmit the control signals with different reference grounds. The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A communication control circuit for a power supply chip, the communication control circuit comprising:
   a) a main control die having a main control circuit;
   b) a plurality of sub-control dice configured to respectively receive a control signal sent by the main control die, wherein each sub-control die comprises a sub-control circuit; and
   c) wherein a reference ground of each sub-control die is different from a reference ground of the main control die, the reference grounds of the plurality of sub-control dice are different with each other, and communication between the main control die and each sub-control die is achieved by a corresponding level conversion circuit.

2. The communication control circuit of claim 1, wherein the sub-control die is manufactured by low voltage manufacturing process.

3. The communication control circuit of claim 1, wherein a number of the level conversion circuits is equal to a number of the sub-control dice.

4. The communication control circuit of claim 3, wherein a plurality of level conversion circuits are arranged in the main control die.

5. The communication control circuit of claim 3, wherein a plurality of level conversion circuits are respectively configured in a plurality of independent conversion dice.

6. The communication control circuit of claim 1, wherein each sub-control die comprises a signal receiving circuit configured to receive the control signal and convert the control signal to a signal required by the sub-control circuit, such that the sub-control circuit performs corresponding functional control.

7. The communication control circuit of claim 1, wherein the level conversion circuit is configured to convert a voltage level of the control signal transmitted by the main control circuit to a voltage level adapted to the sub-control die to realize communication between the main control die and the sub-control die.

8. The communication control circuit of claim 1, wherein a maximum withstand voltage of the level conversion circuit is a maximum voltage difference between the sub-control die and the main control die.

9. The communication control circuit of claim 1, wherein the main control die and the plurality of sub-control dice are packaged in one chip.

10. The communication control circuit of claim 1, wherein the main control circuit is configured to generate logical drive signals for power switches in the power supply circuit, and to generate drive signals for corresponding power switches connected to the reference ground of the main control die.

11. The communication control circuit of claim 10, wherein each of the sub-control circuits is configured to generate a drive signal of a corresponding power switch that is not connected to the reference ground of the main control die.

12. The communication control circuit of claim 11, wherein each of the level conversion circuits is configured to receive the corresponding logical drive signal, and convert the corresponding logical drive signal to a signal adapted to a voltage level of the sub-control die, thereby controlling the sub-control circuit to generate the corresponding drive signal.

13. The communication control circuit of claim 12, wherein:
- a) the level conversion circuit comprises first and second switches;
- b) each of the first and second switches is controlled by the logical drive signal to be turned on or off;
- c) a first terminal of each of the first and second switches is connected to a power supply of the sub-control die; and
- d) a second terminal of each of the first and second switches is connected to the reference ground of the main control circuit, in order to realize level conversion.

14. The communication control circuit of claim 12, wherein each of the level conversion circuits is the same.

\* \* \* \* \*